M. R. HULL.
CHANGEABLE AUTOMOBILE TOP.
APPLICATION FILED JUNE 21, 1915.
1,181,528.  
Patented May 2, 1916.  
2 SHEETS—SHEET 1.
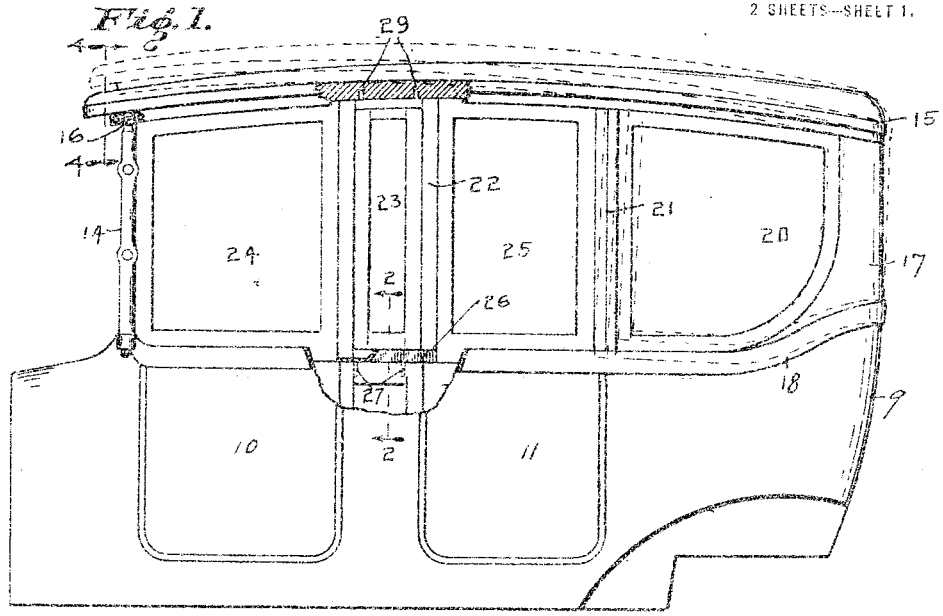
WITNESSES;  
L. B. Woerner  
Wm Hurte
INVENTOR;  
Matthew R. Hull,  
By Minturn & Woerner  
Attorneys M. R. HULL.
CHANGEABLE AUTOMOBILE TOP.
APPLICATION FILED JUNE 21, 1915.
1,181,528.
Patented May 2, 1916.
2 SHEETS—SHEET 2.
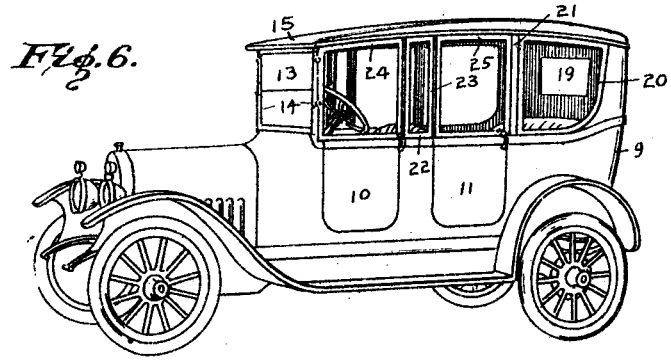
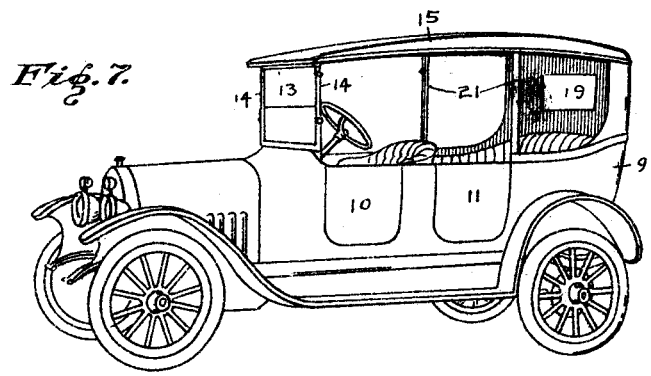
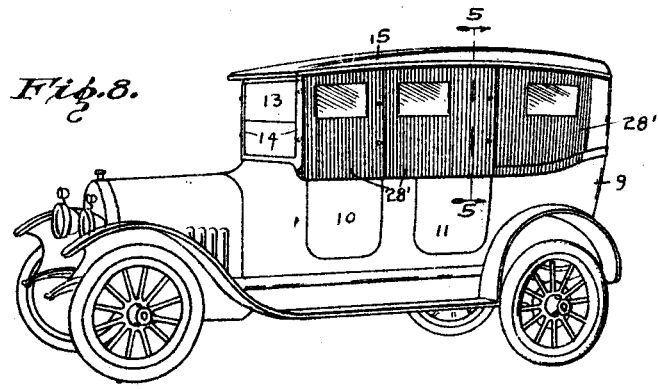

UNITED STATES PATENT OFFICE.

MATTHEW R. HULL, OF CONNERSVILLE, INDIANA, ASSIGNOR TO REX BUGGY COMPANY, OF CONNERSVILLE, INDIANA, A CORPORATION OF INDIANA.

CHANGEABLE AUTOMOBILE-TOP.

1,181,528.   Specification of Letters Patent.   Patented May 2, 1916.

Application filed June 21, 1915. Serial No. 35,418.

*To all whom it may concern:*

Be it known that I, MATTHEW R. HULL, a citizen of the United States, residing at Connersville, in the county of Fayette and State of Indiana, have invented certain new and useful Improvements in Changeable Automobile-Tops, of which the following is a specification.

This invention relates to improvements in automobiles which were once regarded as a luxury to be used in good weather, but are now regarded as a necessity for every day in the year, and it relates particularly to removable or Sedan tops for the popular open-body moderate priced cars, and the object is to provide an inexpensive top adaptable to all makes of cars, and having removable windows and doors, which, when said windows and doors are in will make the body of the vehicle as warm and comfortable as a limousine for winter use, but which may be removed in summer, together with the side panels separating them, to provide free and unobstructed ventilation while retaining the roof or deck as a sun-shade, and, supplemented by rubber curtains, as a protection against rain.

I accomplish the above and other objects which will hereinafter appear, by the mechanism illustrated in the accompanying drawings, in which—

Figure 1 is a side elevation and partial vertical section of an automobile body equipped with my invention in which the doors and windows are in use. Fig. 2 is a section on the line 2—2 of Fig. 1. Fig. 3 is a section on the line 3—3 of Fig. 2. Fig. 4 is a section on the line 4—4 of Fig. 1. Fig. 5 is a section on the line 5—5 of Fig. 8 through one of the rubber side curtains. Fig. 6 is a perspective view of an automobile equipped with my invention, with the doors and windows in as for winter. Fig. 7 is a like view with the top open for summer use by the removal of the windows, top door members and panels between the latter, and Fig. 8 is the same as Fig. 7 with the addition of the rubber side curtains to exclude rain.

Like characters of reference indicate like parts throughout the several views of the drawings.

Referring to the drawings, 9 is an open automobile body having the doors 10 and 11 on each side hinged and operating in the usual manner.

13 is the wind shield which is supported by the front posts 14 in the usual manner.

15 is the roof or deck of a removable top which is supported in front by the posts 14, to which it may be detachably secured in any suitable manner, as by the means usually employed which consists of a ball on the end of the post as shown by dotted lines in Fig. 4, entering a socket 16 which is fastened to the deck by screws, and within which socket the ball is held by a set screw the withdrawal of which will allow the socket to be lifted off of the ball.

The rear end of the deck is supported on vertical members 17 the lower edges of which rest upon the upper edges of the body 9 where the parts are retained by a flange-plate 18 fastened to the members 17. The members 17 have openings for a rear window 19 and side windows 20, and in front of the latter are pillars 21. Between the latter and the posts 14 for the wind-shields are the side panels 22 which support side windows 23 and separate side door members 24 and 25, which form upper extensions of the lower doors 10 and 11.

Channel bars 26 are each fastened by two screws 27 to the upper edges of the body 9 where the side-panels 22 are to be located and receive the corresponding ends of the panels in them. Movement of the panels longitudinally of the channel bars is prevented by upwardly extending pins 28. The upper ends of the panels 22 are provided with dowel pins 29 which enter suitable holes in the deck-frame, as shown in Fig. 1.

The deck 15 is constructed with a frame of hardwood, mitered and mortised, glued and screwed together and ironed and braced in any manner (not shown) which will make the top rigid and free from rattle.

To convert the top from a closed one for winter use into one which is open and well ventilated for summer comfort, all of the windows and upper door members are taken out and the side panels 22 are removed. The removal of the panels 22 is accomplished readily by loosening the deck from the shield-posts 14 by unjointing their ball and socket joints, and lifting up the front end of the deck as shown by dotted lines in Fig.

1, which releases the dowel pins 29 allowing the upper end of the panel to be swung outwardly and free of the deck, after which the panel can be lifted out of the channel bar in which its lower end is seated.

The channel bars are removed by removing the screws 27. The screw holes are used for the attachment of curtain fasteners such as shown in Fig. 5, or any other suitable kind. Similar curtain fasteners are supplied at all of the side and rear openings, for the attachment of curtains 28', of rubber or other suitable material, to exclude rain and wind on occasion during those seasons of the year when the weather is not severe enough to require the windows and doors of the closed top.

Having thus fully described my invention what I claim as new and wish to secure by Letters Patent of the United States, is—

1. A closed vehicle body comprising a rigid deck, a support to which the deck is rigidly attached, said support being removably attached to the vehicle body and side members, said side members being released for removal by raising the deck by swinging it and its said support upwardly of the vehicle body.

2. A closed vehicle comprising an open body, a rigid superimposed deck, a support rigidly attached to and adjacent the end of the deck, and side members between the deck and body which are released for removal in pleasant weather by increasing the distance between the open body and deck by swinging the deck and its support on said body.

3. An open vehicle body having doors, and means for converting it into a closed body comprising a removable top having rear members rigidly attached to the top and removably hinged to the body and also having a rigid jointless deck and sides, said sides having door members which coöperate as extensions of and with said doors of the open body, windows in said sides, and panels separating said doors, all of said doors, windows and panels in the removable sides being removable to form a roofed body with open sides.

4. An open vehicle body having doors, means for converting it into a closed body comprising a removable top having a rigid deck and supports rigidly attached and sides, said sides having door members which coöperate as extensions with said doors of the open body, windows in said sides, panels separating said doors, means for removing the panels by raising the front end of the deck swingingly with and on its said supports, and means for substituting flexible curtains for the doors windows and panels of said removable top.

5. The combination with a vehicle body, of a rigid deck, front and rear supports the latter rigidly attached to the deck holding the deck and body normally in a fixed relation to each other but releasable therefrom in part, a plurality of detachable wall and door sections, means to retain them between the deck and body and to release them by releasing and raising the deck.

6. The combination of an open vehicle body, wind-shield posts supported by the body, rear deck supports movably attached to the body a rigid deck, rigidly attached to said rear supports and having dowel openings, said deck being removably secured to the posts, panels between the body and deck having dowel pins entering said openings, and channeled means for removably securing the lower ends of the panels.

In witness whereof, I have hereunto set my hand and seal at Indianapolis, Indiana, this 14th day of June, A. D. one thousand nine hundred and fifteen.

MATTHEW R. HULL. [L. S.]

Witnesses:
ELLIS W. RYAN,
RAYMOND H. CRAWFORD.